(12) United States Patent
Hayakawa et al.

(10) Patent No.: US 8,817,294 B2
(45) Date of Patent: Aug. 26, 2014

(54) IMAGE FORMING APPARATUS

(71) Applicant: Oki Data Corporation, Tokyo (JP)

(72) Inventors: Yoichi Hayakawa, Tokyo (JP);
Masahiro Sonoda, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/109,173

(22) Filed: Dec. 17, 2013

(65) Prior Publication Data

US 2014/0176985 A1    Jun. 26, 2014

(30) Foreign Application Priority Data

Dec. 26, 2012  (JP) ................... 2012-282008

(51) Int. Cl.
*G06F 15/02* (2006.01)
*H04N 1/00* (2006.01)
*G06K 15/00* (2006.01)
*G06K 15/14* (2006.01)

(52) U.S. Cl.
CPC .......... *G06K 15/408* (2013.01); *H04N 1/00925* (2013.01); *G06K 15/407* (2013.01); *G06K 15/14* (2013.01)
USPC ........................................ 358/1.14; 358/1.15

(58) Field of Classification Search
CPC .............. G03G 15/553; G03G 15/556; G03G 21/1889; G03G 21/1892; G03G 2215/0697; G03G 2221/1823
USPC .................................................. 358/1.1, 1.14
See application file for complete search history.

(56) References Cited

U.S. PATENT DOCUMENTS

| | | | | |
|---|---|---|---|---|
| 7,796,286 B2 * | 9/2010 | Omotani | ...................... | 358/1.15 |
| 8,112,006 B2 * | 2/2012 | Kasai | .............................. | 399/12 |
| 8,194,265 B2 * | 6/2012 | Jung et al. | .................... | 358/1.14 |
| 2007/0297814 A1 | 12/2007 | Kasai | | |

FOREIGN PATENT DOCUMENTS

JP        2008-003259 A    1/2008

* cited by examiner

*Primary Examiner* — King Poon
*Assistant Examiner* — Iriana Cruz
(74) *Attorney, Agent, or Firm* — Rabin & Berdo, P.C.

(57) ABSTRACT

An image forming apparatus includes a main body and a replaceable component. The main body includes a first storage unit storing first authentication informations for authentication with the replaceable component, a data storage unit storing authentication data for choosing the first authentication information. The replaceable component includes a second storage unit storing second authentication informations corresponding to the first authentication information. Authentication data is set to be different among different image forming apparatuses. The main body attempts authentication with the replaceable component using the first authentication information chosen based on the authentication data. When the second authentication information corresponding to the chosen first authentication information is stored, a control unit establishes connection between communication units of the main body and the replaceable component.

14 Claims, 14 Drawing Sheets

FIRST AUTHENTICATION
INFORMATION STORAGE UNIT 24

SECOND AUTHENTICATION
INFORMATION STORAGE UNIT 28

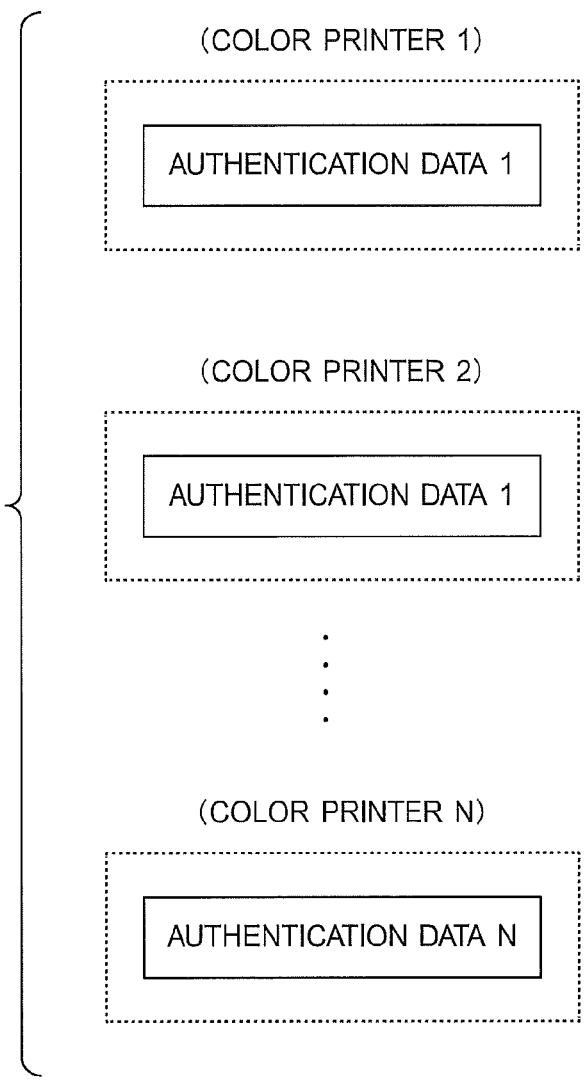

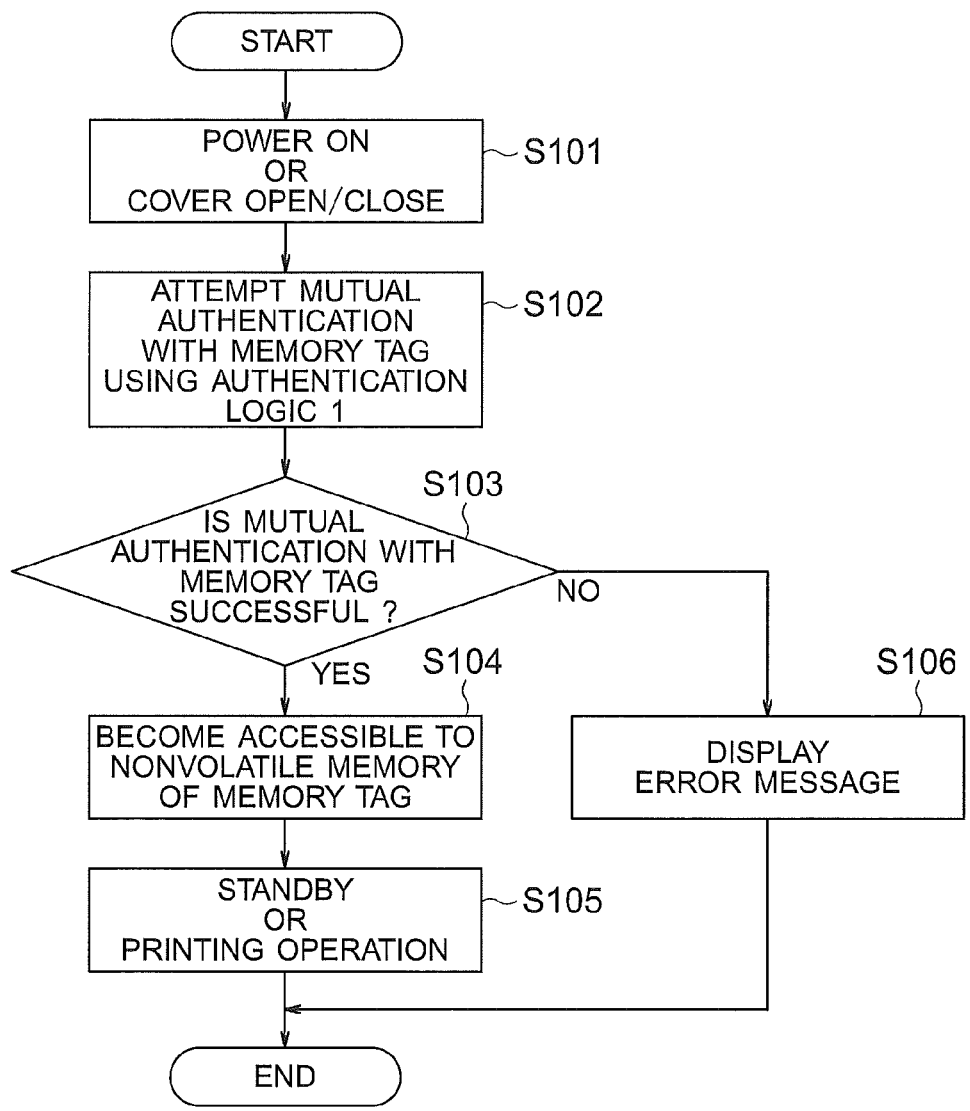

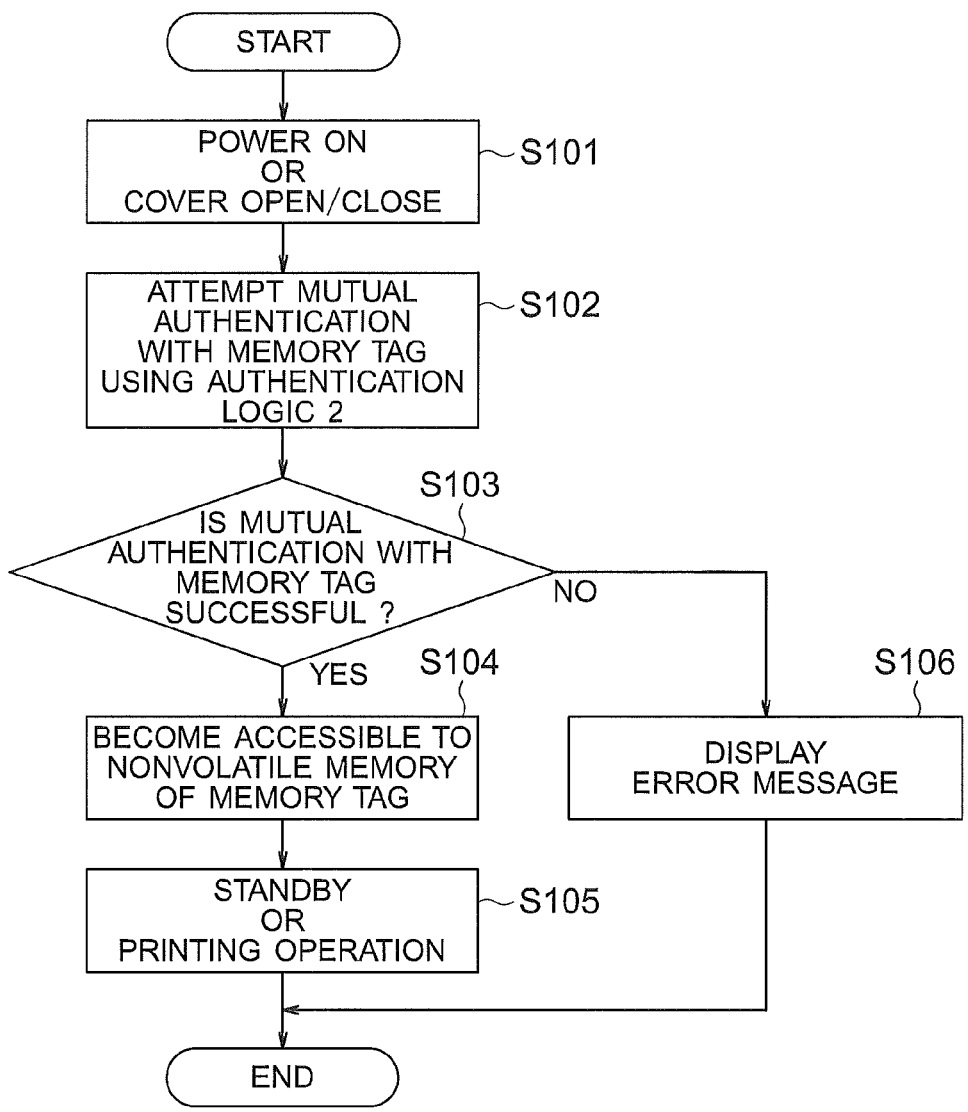

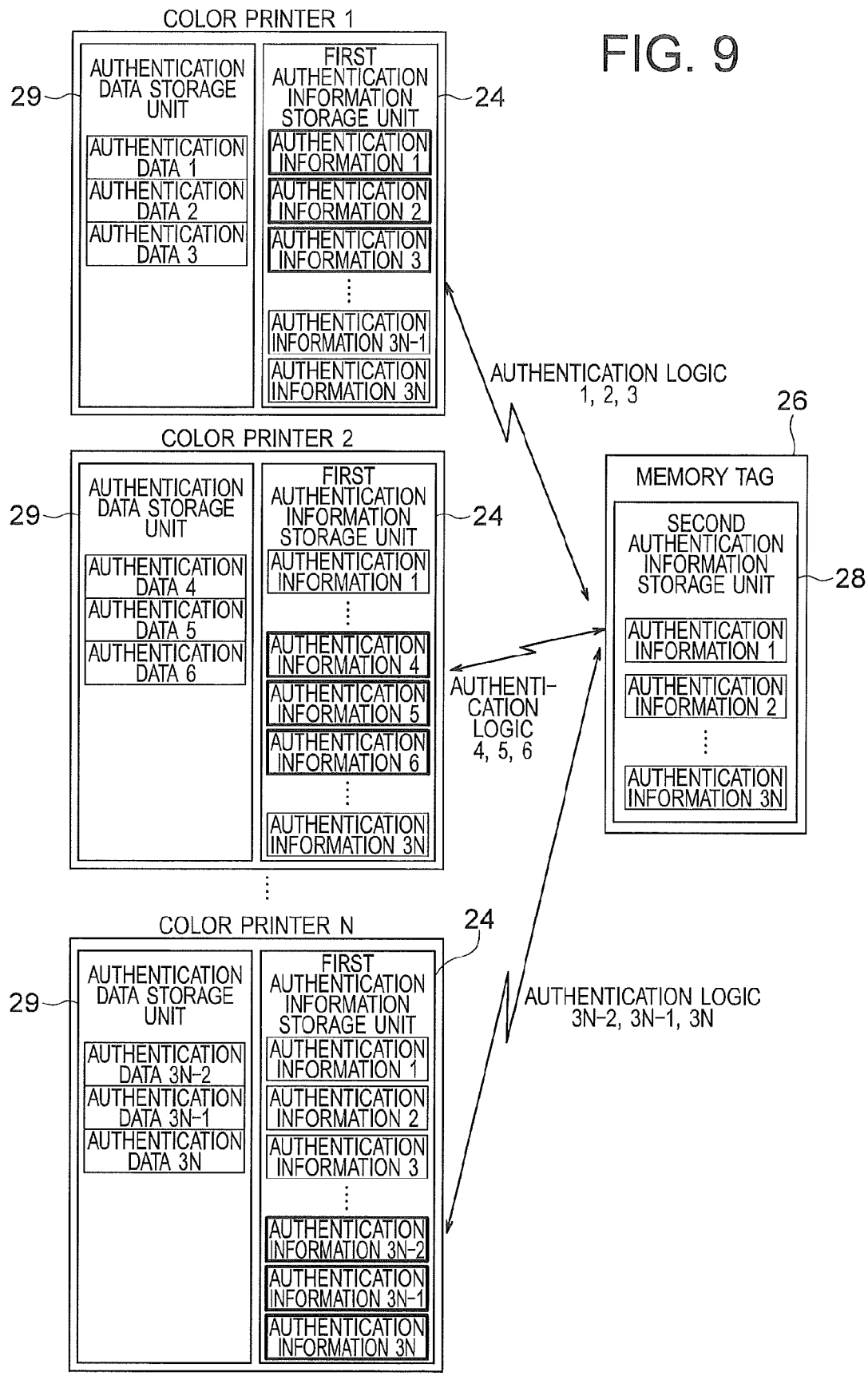

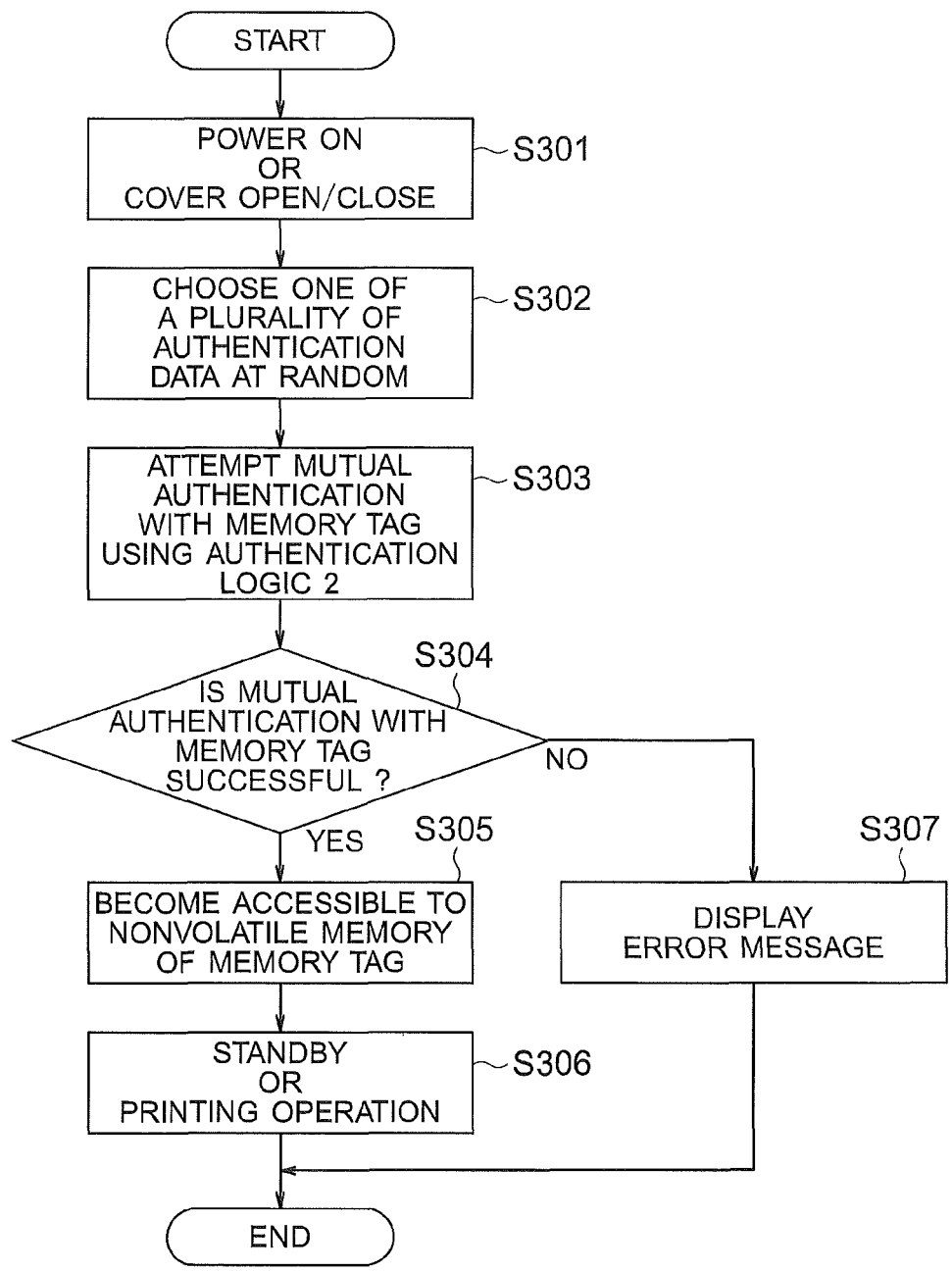

IMAGE FORMING APPARATUS

BACKGROUND OF THE INVENTION

The present invention relates to an image forming apparatus.

There is an electrophotographic image forming apparatus such as a printer, a copier or a facsimile machine including a plurality of developing units respectively storing predetermined toners (i.e., developers). The developing units are provided so as to face image bearing bodies, and configured to develop latent images formed on the image bearing bodies. Toner cartridges (i.e., replaceable components) are detachably mounted to a main body of the image forming apparatus for replenishing the toners to the developing units.

Further, there is proposed an image forming apparatus capable of determining whether a toner cartridge mounted thereto is guaranteed to be used in the image forming apparatus. Such an image forming apparatus has a communication unit for communication with a communication unit provided on the toner cartridge (mounted to the image forming apparatus), reads individual information of the toner cartridge, and determines whether the toner cartridge conforms to the image forming apparatus. When the mounted toner cartridge does not conform to the image forming apparatus, the image forming apparatus performs processing which is different from normal processing (see, for example, Japanese Laid-open Patent Publication No. 2008-3259).

There may be cases where an image forming apparatus (for example, a printer) is first launched on the market, and at a later time an improved image forming apparatus (provided with an additional function such as a scanning function, or modified in function) is launched on the market. Here, the image forming apparatus first launched on the market is referred to as the "preceding image forming apparatus", and the image forming apparatus later launched on the market is referred to as the "succeeding image forming apparatus". The succeeding image forming apparatus has individual information which is different from that of the preceding image forming apparatus. The toner cartridge used in the succeeding image forming apparatus has individual information which is different from that of the toner cartridge designed used in the preceding image forming apparatus.

In the conventional art, determination whether the toner cartridge conforms to the image forming apparatus is performed based on whether the individual information of the toner cartridge matches the individual information of the image forming apparatus. Therefore, even when the toner cartridge is configured to be compatible with different image forming apparatuses (for example, the preceding and succeeding image forming apparatuses), the toner cartridge may be restricted from being used in the image forming apparatuses. As a result, the toner cartridge (i.e., the replaceable component) needs to be managed in a complicated manner.

SUMMARY OF THE INVENTION

An aspect of the present invention is intended to provide an image forming apparatus capable of facilitating management of a replaceable component, and capable of determining whether the replaceable component conforms to the image forming apparatus.

According to an aspect of the present invention, there is provided an image forming apparatus including a main body, and a replaceable component mounted to the main body. The replaceable component is configured to be compatible with a plurality of image forming apparatuses. The main body includes a first authentication information storage unit that stores a plurality of first authentication information for authentication with the replaceable component, an authentication data storage unit that stores authentication data for choosing at least one of the plurality of first authentication information, a first communication unit for communication with the replaceable component, and a control unit that controls the first communication unit. The replaceable component includes a second authentication information storage unit that stores a plurality of second authentication information corresponding to the first authentication information, and a second communication unit for communication with the first communication unit. The authentication data is set to be different among the plurality of image forming apparatuses. The control unit attempts authentication with the replaceable component using the first authentication information chosen based on the authentication data by checking whether the second authentication information corresponding to the chosen first authentication information is stored in the second authentication information storage unit. When the second authentication information corresponding to the chosen first authentication information is stored in the second authentication information storage unit, the control unit establishes connection between the first communication unit and the second communication unit.

With such a configuration, it becomes possible to provide an image forming apparatus capable of facilitating management of the replaceable component, and capable of determining whether the replaceable component conforms to the image forming apparatus.

Further scope of applicability of the present invention will become apparent from the detailed description given hereinafter. However, it should be understood that the detailed description and specific embodiments, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the attached drawings:

FIG. 4 is a schematic diagram showing memory structures of the authentication data storage units of the first embodiment;

FIG. 5A is a flowchart showing authentication processing with a replaceable component performed by the color printer of the first embodiment;

FIG. 5B is a flowchart showing the authentication processing with the replaceable component performed by another color printer of the first embodiment;

FIG. 9 is a schematic diagram for illustrating mutual authentication of the second embodiment;

FIG. 10 is a flowchart showing authentication processing with a replaceable component performed by a color printer of the third embodiment;

DETAILED DESCRIPTION OF THE PREFERRED EMBODIMENT

Hereinafter, an image forming apparatus according to embodiments of the present invention will be described with reference to drawings. The present invention is not limited to the embodiments described below. The embodiments can be modified without departing the scope of the present invention.

First Embodiment

Description will be made of a color printer 1 as an image forming apparatus according to the first embodiment of the present invention. The color printer 1 is configured to form a color image using toners of Black (K), Yellow (Y), Magenta (M) and Cyan (C).

Figure 1:
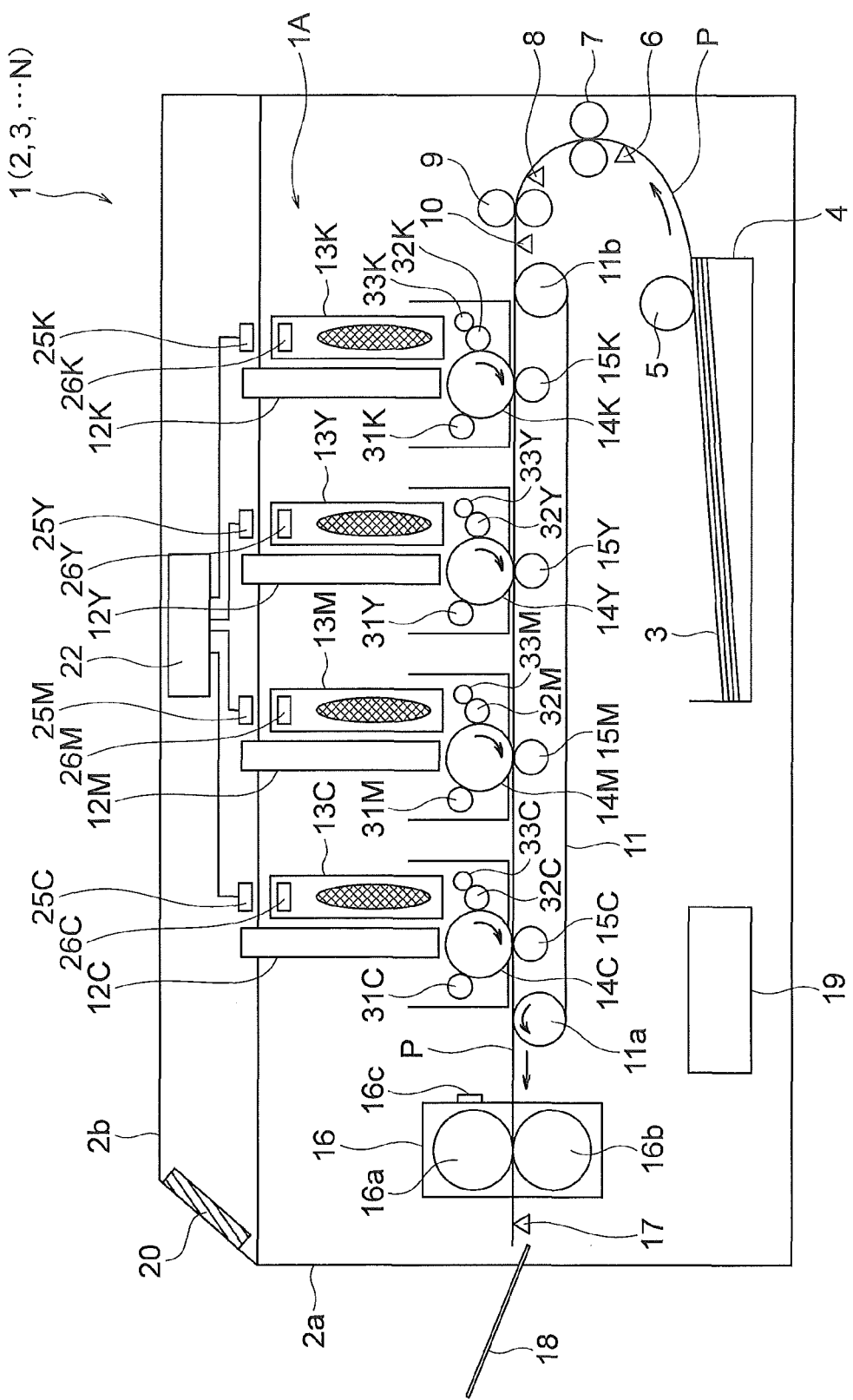
FIG. 1 is a schematic sectional view showing a configuration of a color printer of the first embodiment of the present invention.

FIG. 1 is a schematic sectional view showing a configuration of the color printer 1.

As shown in FIG. 1, the color printer 1 includes a main body 2a and a top cover 2b. The top cover 2b is swingably provide on the main body 2a so as to open and close the main body 2a. A medium conveying path P is provided in the main body 2a. The medium conveying path P starts from a recording medium storage unit 4 and ends at an ejection stacker portion 18. A feed roller 5, a first entrance sensor 6, first registration rollers 7, a second entrance sensor 8, second registration rollers 9, a writing sensor 10, a conveying belt 11, a fixing unit 16 and an exit sensor 17 are provided along the medium conveying path P in the main body 2a.

The recording medium storage unit 4 stores a stack of recording media (such as printing sheets) 3, and is detachably mounted to a lower part of the color printer 1. A feed roller 5 is provided above the recording medium storage unit 4 so as to contact the uppermost recording medium 3 stored in the recording medium storage unit 4. The feed roller 5 rotates to feed the recording medium 3 into the medium conveying path P.

The first entrance sensor 6 is provided upstream of the first registration rollers 7 along the medium conveying path P. The first entrance sensor 6 is configured to detect a passage of the recording medium 3.

The first registration rollers 7 are configured to convey the recording medium 3 (fed out of the recording medium storage unit 4 by the feed roller 5) to the second registration rollers 9.

The second entrance sensor 8 is provided downstream of the first registration rollers 7 and upstream of the second registration rollers 9 along the medium conveying path P. The second entrance sensor 8 is configured to detect a passage of the recording medium 3.

The second registration rollers 9 are configured to correct skew of the recording medium 3 (having been conveyed by the first registration rollers 7) and convey the recording medium 3 to the conveying belt 11.

The writing sensor 10 is provided downstream of the second registration rollers 9 along the medium conveying path P. The writing sensor 10 is configured to detect a passage of the recording medium 3. Detection signal of the writing sensor 10 is used to determine when the recording medium 3 reaches an image forming section 1A as described later.

The conveying belt 11 is an endless belt that electrostatically absorbs the recording medium 3 and conveys the recording medium 3. The conveying belt 11 is stretched around a pair of rollers, i.e., a driving roller 11a and a tensioning roller 11b. The driving roller 11a is driven to rotate by a not shown driving unit (i.e., a driving motor). The tensioning roller 11b applies tension to the conveying belt 11.

The fixing unit 16 is provided downstream of the image forming section 1A along the medium conveying path P. The fixing unit 16 includes a heating roller 16a, a backup roller 16b and a thermistor 16c. The heating roller 16a includes a metal core composed of aluminum or the like and having a cylindrical hollow shape, and a heat-resistant resilient layer (composed of silicone rubber or the like) formed on the metal core. The resilient layer is covered with a tube formed of PFA (tetra fluoro ethylene-perfluoro alkylvinyl ether copolymer) or the like. A heater such as a halogen lamp is provided inside the metal core of the heating roller 16a. The backup roller 16b includes a metal core composed of aluminum or the like, and a heat-resistant resilient layer (composed of silicone rubber or the like) formed on the metal core. The resilient layer is covered with a tube formed of PFA or the like. A nip portion is formed between the heating roller 16a and the backup roller 16b for applying heat and pressure to the recording medium 3. The thermistor 16c functions as a detecting unit for detecting a surface temperature of the heating roller 16a. The thermistor 16c is provided in the vicinity of the heating roller 16a so as not to contact the heating roller 16a. The thermistor 16c detects a surface temperature of the heating roller 16a, and sends temperature information to a control unit 21. The control unit 21 performs ON/OFF control of the heater based on the temperature information from the thermistor 16c so as to maintain the surface temperature of the heating roller 16a to a predetermined temperature. When the recording medium 3 passes the nip portion between the heating roller 16a and the backup roller 16b, heat and pressure are applied to the toner on the recording medium 3, and the toner is molten and fixed to the recording medium 3.

The exit sensor 17 is provided downstream of the fixing unit 16 along the medium conveying path. The exit sensor 17 is configured to detect passage of the recording medium 3. Detection signal of the exit sensor 17 is used to detect that the recording medium 3 has been ejected by the fixing unit 16.

The ejection stacker portion 18 is provided outside the main body 2a. The recording medium 3 ejected from the fixing unit 16 is placed on the ejection stacker portion 18.

Next, the image forming section 1A of the color printer 1 will be described. The image forming section 1A includes LED (Light Emitting Diode) heads 12K, 12Y, 12M and 12C, toner cartridges 13K, 13Y, 13M and 13C, photosensitive drums 14K, 14Y, 14M and 14C, charging rollers 31K, 31Y, 31M and 31C, developing rollers 32K, 32Y, 32M and 32C, supplying rollers 33K, 33Y, 33M and 33C and transfer rollers 15K, 15Y, 15M and 15C.

The LED heads 12K, 12Y, 12M and 12C (i.e., exposure units) are configured to emit light to form latent images respectively according to print data of black, yellow, magenta and cyan. The LED heads 12K, 12Y, 12M and 12C are supported by holders provided on the top cover 2b. The LED heads 12K, 12Y, 12M and 12C include LED elements and lens arrays. The LED heads 12K, 12Y, 12M and 12C are disposed so that lights emitted by the LED heads 12K, 12Y, 12M and 12C are focused on surfaces of the photosensitive drums 14K, 14Y, 14M and 14C (described later) in a state where the top cover 2b is closed. The LED heads 12K, 12Y, 12M and 12C emit light according to print data of respective colors so as to expose the surfaces of the photosensitive drums 14K, 14Y, 14M and 14C so that latent images are formed on the photosensitive drums 14K, 14Y, 14M and 14C. The LED heads 12K, 12Y, 12M and 12C are connected to the control unit 21 provided in the main body 2a via cables.

The toner cartridges (i.e., replaceable components or developer cartridges) 13K, 13Y, 13M and 13C respectively store toners (i.e., developers) of black, yellow, magenta and cyan. Each of the toner cartridges 13K, 13Y, 13M and 13C needs to be replaced when a remaining amount of the stored toner becomes small. Therefore, the toner cartridges 13K, 13Y, 13M and 13C are configured to be detachable from the color printer 1.

Each of the photosensitive drums 14K, 14Y, 14M and 14C (i.e., image bearing bodies) includes an electrically conductive body and a photoconductive layer formed on the electrically conductive body. For example, each of the photosensitive drums 14K, 14Y, 14M and 14C is formed of an organic photosensitive body. More specifically, the electrically conductive body is formed of, for example, a metal shaft composed of aluminum. The photoconductive layer is formed of, for example, an electron generation layer and an electron transport layer laminated on the electrically conductive body. The photosensitive drums 14K, 14Y, 14M and 14C rotate in a predetermined direction.

The charging rollers 31K, 31Y, 31M and 31C (i.e., charging members) are provided so as to contact the surfaces of the photosensitive drums 14K, 14Y, 14M and 14C. Each of the charging rollers 31K, 31Y, 31M and 31C includes a metal shaft and a resilient layer (composed of, for example, epichlorohydrin rubber) formed on the metal shaft. The charging rollers 31K, 31Y, 31M and 31C are applied with a voltage (i.e., a charging voltage) by charging roller power sources provided in a power source unit 19.

The developing rollers 32K, 32Y, 32M and 32C (i.e., developer bearing bodies) are provided so as to contact the surfaces of the photosensitive drums 14K, 14Y, 14M and 14C. The developing rollers 32K, 32Y, 32M and 32C rotates in a direction opposite to a rotating direction of the photosensitive drums 14K, 14Y, 14M and 14C. Each of the developing rollers 32K, 32Y, 32M and 32C includes a metal shaft and a resilient layer (composed of, for example, silicone rubber or urethane rubber with carbon additives) formed on the metal shaft. Each of the developing rollers 32K, 32Y, 32M and 32C are applied with a voltage (i.e., a developing voltage) by developing roller power sources provided in the power source unit 19.

The supplying rollers 33K, 33Y, 33M and 33C (i.e., supplying members) are provided so as to contact the surfaces of the developing rollers 32K, 32Y, 32M and 32C. The supplying rollers 33K, 33Y, 33M and 33c rotate in the same direction as a rotating direction of the developing rollers 32K, 32Y, 32M and 32C. Each of the supplying rollers 33K, 33Y, 33M and 33C includes a metal shaft and a resilient layer (composed of, for example, foamed semiconductive silicone sponge) formed on the metal shaft.

According to the rotation of the photosensitive drums 14K, 14Y, 14M and 14C, the surfaces of the photosensitive drums 14K, 14Y, 14M and 14C are uniformly charged by the charging rollers 31K, 31Y, 31M and 31C, and are exposed with light emitted by the LED heads 12K, 12Y, 12M and 12C so that latent images are formed on the surfaces of the photosensitive drums 14K, 14Y, 14M and 14C. The toners are replenished by the toner cartridges 13K, 13Y, 13M and 13C, and are supplied to the developing rollers 32K, 32Y, 32M and 32C by the supplying rollers 33K, 33Y, 33M and 33C. The toners on the developing rollers 32K, 32Y, 32M and 32C adhere to the latent images on the surfaces of the photosensitive drums 14K, 14Y, 14M and 14C by electrostatic force, and toner images (i.e., developer images) are formed.

The transfer rollers 15K, 15Y, 15M and 15C (i.e., transfer members) are respectively pressed against the photosensitive drums 14K, 14Y, 14M and 14C via the conveying belt 11. Each of the transfer rollers 15K, 15Y, 15M and 15C includes a metal shaft and a resilient layer (composed of, for example, electrically conductive rubber or the like) formed on the metal shaft. The transfer rollers 15K, 15Y, 15M and 15C are applied with a voltage (i.e., a transfer voltage) by transfer roller power sources provided in the power source unit 19, and transfer the toner images from the surfaces of the photosensitive drums 14K, 14Y, 14M and 14C to the recording medium 3.

The power source unit 19 (i.e., a high voltage power source unit) of the color printer 1 includes the above described charging roller power sources, the developing roller power sources, and the transfer roller power sources that respectively generate the charging voltages, the developing voltages and the transferring voltages used in electrophotographic process.

The color printer 1 further includes a display unit 20. The display unit 20 includes a display panel such as an LCD (Liquid Crystal Display), and a print circuit having switches. The display unit 20 is connected to the control unit 21 via a not shown cable. The display unit 20 is configured to display a condition of the color printer 1, and to receive user's operation input. For example, the display panel (LCD) displays the condition of the color printer 1 in two lines each including 24 characters.

The first entrance sensor 6, the second entrance sensor 8, the writing sensor 10 and the exit sensor 17 (i.e., sensors for detecting the passage of the recording medium 3) are connected to the control unit 21 via not shown cables. The feed roller 5, the first registration rollers 7, the second registration rollers 9, the driving roller 11a, the photosensitive drums 14K, 14Y, 14M and 14C, the transfer rollers 15K, 15Y, 15M and 15C, the heating roller 16a and the backup roller 16b are driven to rotate by not shown actuators (i.e., motors) via power transmission units and convey the recording medium 3 from upstream to downstream along the medium conveying path P. The charging rollers 31K, 31Y, 31M and 31C rotate following the rotations of the photosensitive drums 14K, 14Y, 14M and 14C. The developing rollers 32K, 32Y, 32M and 32C are driven to rotate by power transmitted from the photosensitive drums 14K, 14Y, 14M and 14C. The supplying rollers 33K, 33Y, 33M and 33C rotate following the rotations of the developing rollers 32K, 32Y, 32M and 32C.

Figure 2:
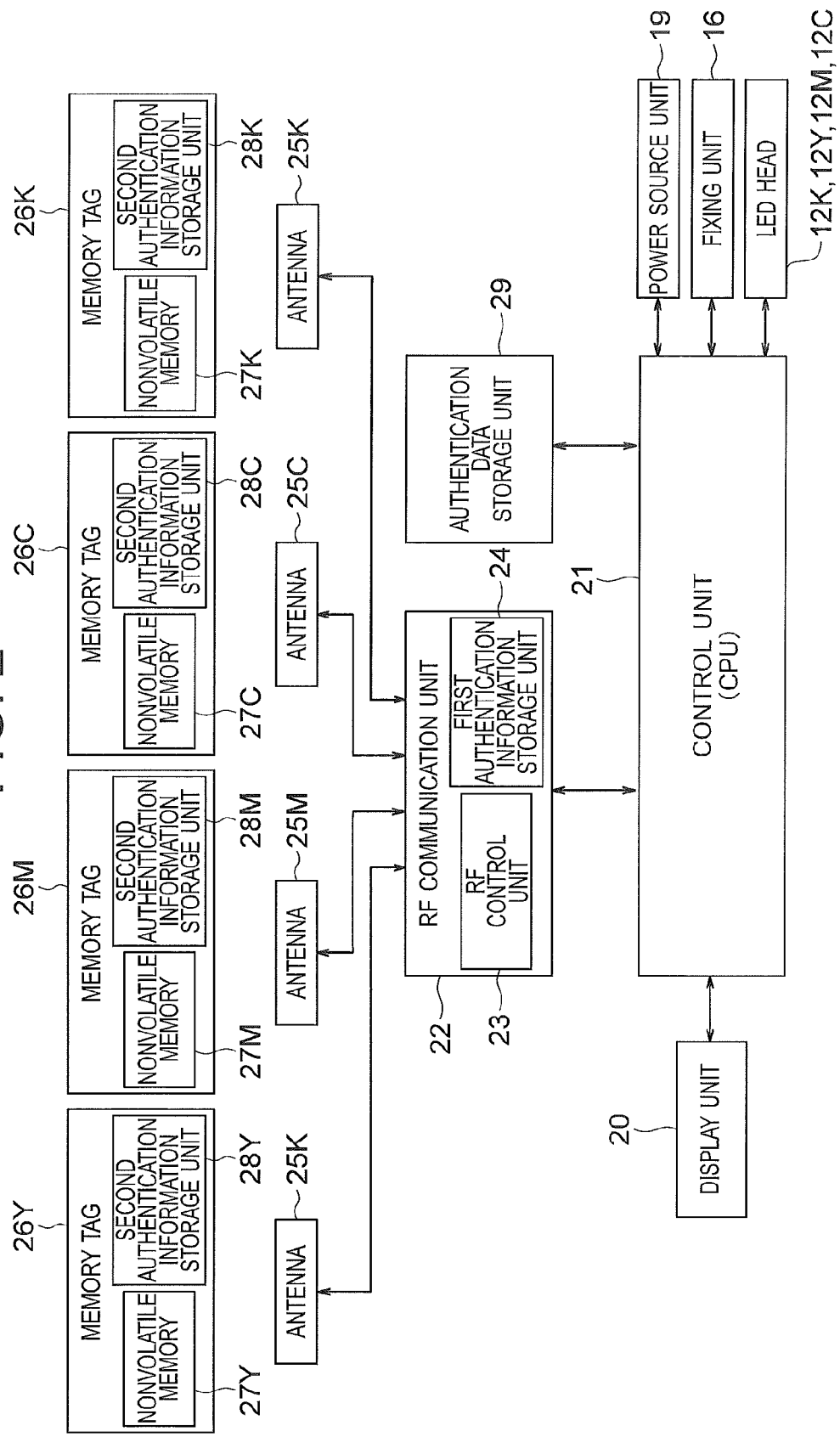
FIG. 2 is a block diagram showing a control system of the color printer of the first embodiment.

Next, a control system of the color printer 1 will be described with reference to FIG. 2. FIG. 2 is a block diagram showing a main part of the control system of the color printer 1 of the first embodiment.

As shown in FIG. 2, the control unit 21 includes a CPU (Control Processing Unit), and controls an entire operation of the color printer 1. The control unit 21 performs respective processing according to programs for entirely controlling the color printer 1. The control unit 21 is connected to the LED heads 12K, 12Y, 12M and 12C, the fixing unit 16, the power source unit 19, the display unit 20, an RF (Radio Frequency) communication unit 22 and an authentication data storage unit 29 via an input/output port. The control unit 21 is also connected to the above described sensors and actuators (which are omitted in FIG. 2). The control unit 21 receives signals from the sensors, and controls the actuators.

The RF communication unit 22 (i.e., a first communication unit) includes an RF control unit 23 and a first authentication information storage unit 24. The RF communication unit 22 is connected to antennas 25K, 25Y, 25M and 25C via cables. Memory tags 26K, 26Y, 26M and 26C (i.e., a second communication unit) are mounted to the toner cartridges 13K, 13Y, 13M and 13C. The antennas 25K, 25Y, 25M and 25C and memory tags 26K, 26Y, 26M and 26C are provided for black (K), yellow (Y), magenta (M) and cyan (C). The RF control unit 23 controls data readout and data writing with respect to the memory tags 26K, 26Y, 26M and 26C. That is, the RF control unit 23 controls communication with the memory tags 26K, 26Y, 26M and 26C. The RF communication unit 22 is allowed to read data from and write data to the memory tags 26K, 26Y, 26M and 26C only when mutual authentication (described later) between the RF communication unit 22 and the memory tags 26K, 26Y, 26M and 26C is successful.

Figure 3A:
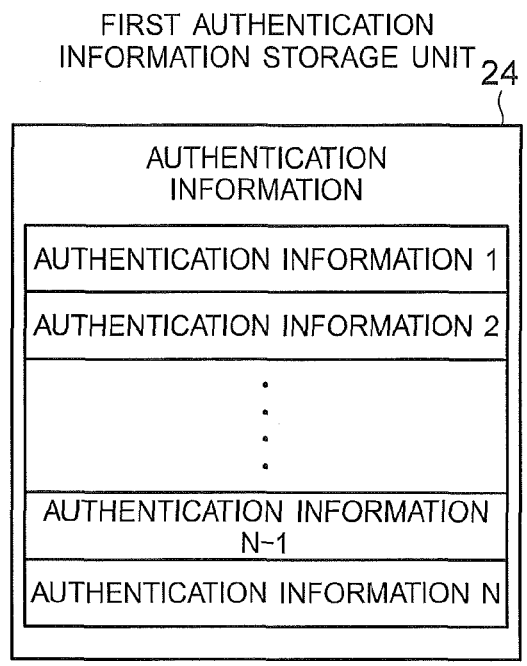
FIG. 3A is a schematic diagram showing a memory structure of a first authentication information storage unit of the first embodiment.

The first authentication information storage unit 24 stores a plurality of authentication information. For example, as shown in FIG. 3A, the first authentication information storage unit 24 stores authentication information 1, authentication information 2, authentication information 3, . . . and authentication information N.

Figure 3B:
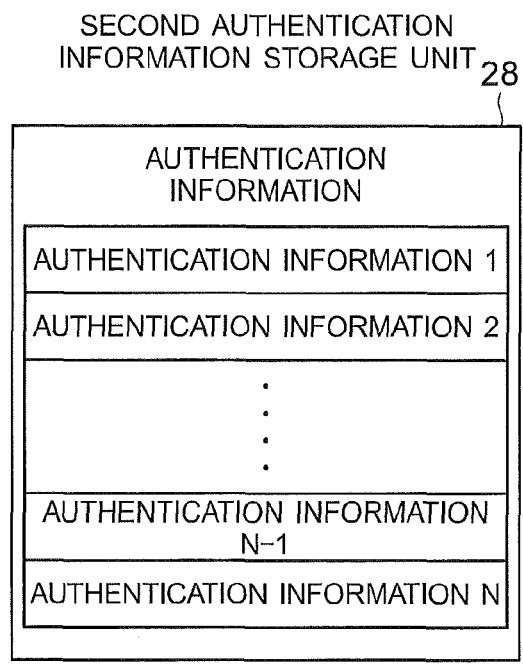
FIG. 3B is a schematic diagram showing a memory structure of a second authentication information storage unit of the first embodiment.

The memory tags 26K, 26Y, 26M and 26C includes nonvolatile memories 27K, 27Y, 27M an 27C and second authentication information storage units 28K, 28Y, 28M and 28C. Each of the second authentication information storage units 28K, 28Y, 28M and 28C stores a plurality of authentication information. For example, as shown in FIG. 3B, each of the second authentication information storage units 28K, 28Y, 28M and 28C stores the authentication information 1, the authentication information 2, the authentication information 3, . . . and the authentication information N, which are the same as those stored in the first authentication information storage unit 24.

The authentication data storage unit 29 stores different authentication data assigned to the color printers (i.e., color printers 1, 2, . . . N) which were launched on the market at different times. Here, the color printers 1, 2, . . . N have the configuration shown in FIGS. 1 and 2 (i.e., the configuration of the first embodiment), and are different in time of launch on the market. The authentication data is used to determine which logic is to be used when the RF communication unit 22 performs mutual authentication with the memory tags 26K, 26Y, 26M and 26C.

FIG. 4 is a schematic diagram showing memory structures of the authentication data storage units 29 of the color printers 1, 2, . . . N. As shown in FIG. 4, the authentication data 29 of the color printer 1 stores authentication data 1. The authentication data 29 of the color printer 2 stores authentication data 2. Similarly, the authentication data 29 of the color printer N stores authentication data N.

The authentication information is authentication logic used in the mutual authentication between the RF communication unit 22 and the memory tags 26K, 26Y, 26M and 26C. One of a plurality of authentication information is chosen based on the authentication data. For example, the color printer 1 having the authentication data 1 uses the authentication information 1 (i.e., authentication logic 1) in performing the mutual authentication with the memory tags 26K, 26Y, 26M and 26C. The color printer 2 having the authentication data 2 uses the authentication information 2 (i.e., authentication logic 2) in performing the mutual authentication with the memory tags 26K, 26Y, 26M and 26C.

The "mutual authentication" is that the memory tags 26K, 26Y, 26M and 26C authenticate the RF communication unit 22, and the RF communication unit 22 authenticates the memory tags 26K, 26Y, 26M and 26C. In other words, the mutual authentication is a security method with which the RF communication unit 22 becomes accessible to the nonvolatile memories 27K, 27Y, 27M and 27C only when the RF communication unit 22 and the memory tags 26K, 26Y, 26M and 26C successfully authenticate each other. The mutual authentication is performed according to an algorism which is maintained as a secret. Each of the RF communication unit 22 and the memory tags 26K, 26Y, 26M and 26C holds a plurality of such algorisms as a plurality of the authentication information. Therefore, when one of a plurality of the authentication information is chosen based on the authentication data, it means that one of a plurality of algorisms associated with the authentication data is chosen.

An operation of the color printer 1 of the first embodiment will be described. First, a printing operation of the color printer 1 of the first embodiment will be described.

When the control unit 21 receives print command from, for example, a host controller such as a personal computer (PC) or the like, the control unit 21 starts a printing operation by controlling respective components according to a control program.

The control unit 21 drives the actuators (i.e., motors) to start rotating the feed roller 5, the first registration rollers 7 and the second registration rollers 9. As the feed roller 5, the first registration rollers 7 and the second registration rollers 9 start rotating, the recording medium 3 is fed out of the recording medium storage unit 4 to the image forming section 1A. Rotations of the feed roller 5, the first registration rollers 7 and the second registration rollers 9 are started at timings determined based on timings when the recording medium 3 is detected by the first entrance sensor 6, the second entrance sensor 8 and the writing sensor 10.

Further, when the writing sensor 10 detects a leading edge of the recording medium 3, the control unit 21 starts a printing process operation. To be more specific, the control unit 21 causes the charging roller power sources of the power source unit 19 to apply the charging voltage to the charging rollers 31K, 31Y, 31M and 31C. The surfaces of the photosensitive drums 14K, 14Y, 14M and 14C are uniformly charged the charging rollers 31K, 31Y, 31M and 31C.

Then, the control unit 21 causes the LED heads 12K, 12Y, 12M and 12C to emit light according to print data (sent from the host controller) so as to expose the surfaces of the photosensitive drums 14K, 14Y, 14M and 14C. Latent images corresponding to the print data are formed on the surfaces of the photosensitive drums 14K, 14Y, 14M and 14C. In this process, the photosensitive drums 14K, 14Y, 14M and 14C, the charging roller 31K, 31Y, 31M and 31C, the developing rollers 32K, 32Y, 32M and 32C, the supplying rollers 33K, 33Y, 33M and 33C and the transfer rollers 15K, 15Y, 15M and 15C are driven to rotate by the actuators.

The developing rollers 32K, 32Y, 32M and 32C applied with the developing voltage by the developing roller power sources of the power source unit 19 under control of the control unit 21. The developing rollers 32K, 32Y, 32M and 32C supply the toner (replenished by the toner cartridges 13K, 13Y, 13M and 13C) to the surfaces of the photosensitive drums 14K, 14Y, 14M and 14C. The toner adheres to the latent images on the surfaces of the photosensitive drums 14K, 14Y, 14M and 14C with an electric force, and the toner images are formed on the surfaces of the photosensitive drums 14K, 14Y, 14M and 14C.

The transfer rollers 15K, 15Y, 15M and 15C are applied with the transfer voltages by the transfer roller power sources of the power source unit 19 under control of the control unit 21. The transfer rollers 15K, 15Y, 15M and 15C transfer the toner images from the photosensitive drums 14K, 14Y, 14M and 14C to the recording medium 3 when the recording medium 3 passes respective nip portions between the photosensitive drums 14K, 14Y, 14M and 14C and the transfer rollers 15K, 15Y, 15M and 15C. In this example, the toner images of black (K), yellow (Y), magenta (M) and cyan (C) are laminated on the recording medium 3 in this order.

The control unit 21 controls a temperature of the heater in the heating roller 16a so as to maintain the surface temperature of the heating roller 16a to a predetermined temperature. The recording medium 3 to which the toner image is transferred passes through the nip portion between the heating roller 16a and the pressure roller 16b, and is applied with heat and pressure. The toner is molten and fixed to the recording medium 3. The recording medium 3 (to which the toner image is fixed by the fixing unit 16) passes the exit sensor 17, and is ejected from the color printer 1. The ejected recording medium 3 is placed on the stacker portion 18.

Figure 6:
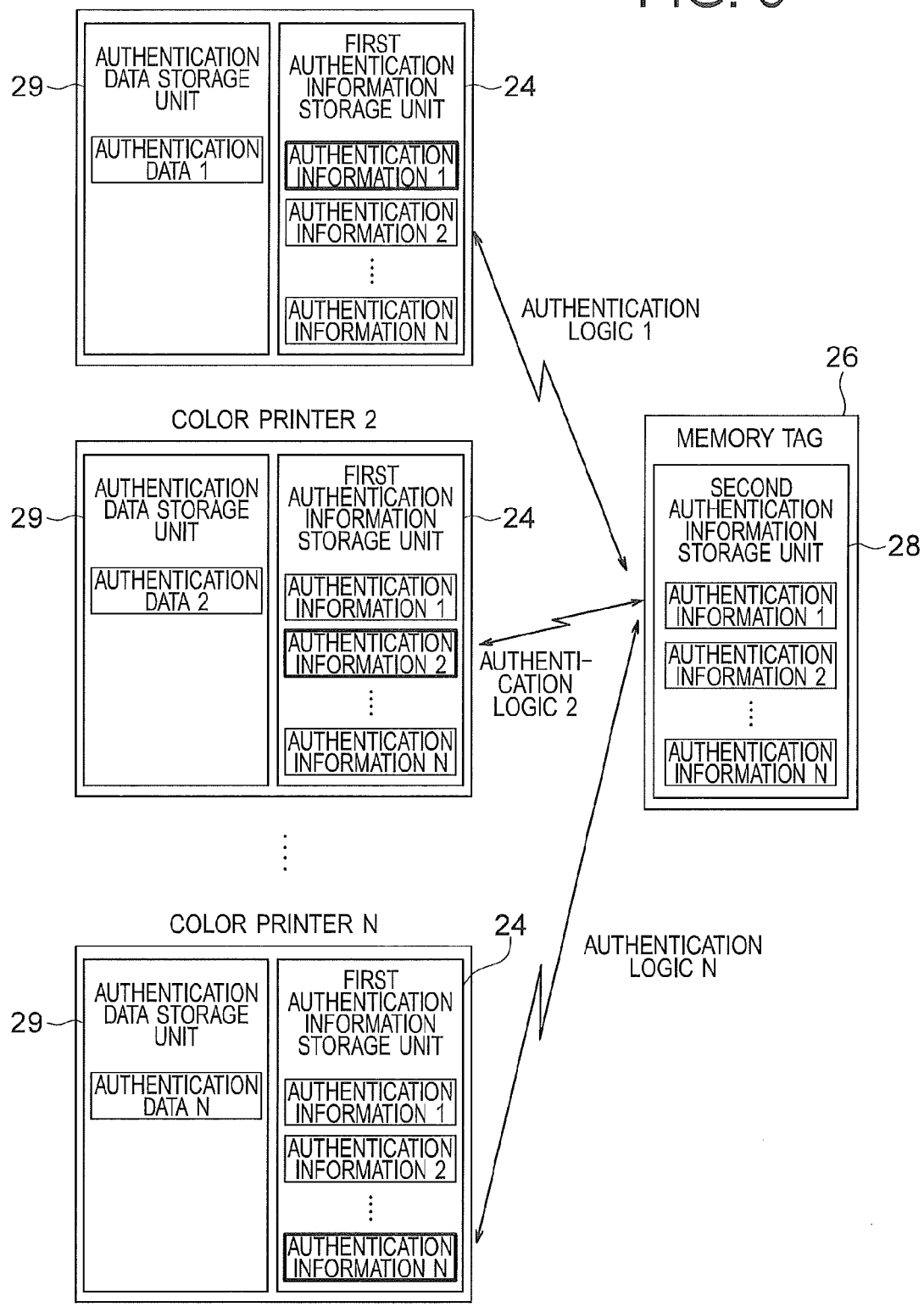
FIG. 6 is a schematic diagram for illustrating mutual authentication of the first embodiment.

Next, description will be made of the authentication processing with the replaceable component (i.e., the toner cartridge 13) performed by the color printer 1. FIGS. 5A and 5B are flowcharts showing the authentication processing with the replaceable component performed by the color printer 1 and the color printer 2. FIG. 6 is a schematic diagram for illustrating mutual authentication of the first embodiment.

In FIG. 6, the color printers 1, 2, 3, N have the configuration shown in FIGS. 1 and 2, and are different in time of launch on the market. For example, the color printer 2 was launched on the market two years after the color printer 1 was launched on the market. The authentication data storage unit 29 of the color printer 1 stores the authentication data 1. The authentication data storage unit 29 of the color printer 2 stores the authentication data 2. Similarly, the authentication data storage unit 29 of the color printer N stores the authentication data N.

FIG. 5A shows the authentication processing performed by the color printer 1, and FIG. 5B shows the authentication processing performed by the color printer 2. The authentication processing shown in FIG. 5A and the authentication processing shown in FIG. 5B are the same as each other except the authentication logic used in the mutual identification.

Hereinafter, the toner cartridges 13K, 13Y, 13M and 13C (i.e., replaceable components) are collectively referred to as the toner cartridge 13. The memory tags 26K, 26Y, 26M and 26C mounted to the toner cartridges 13K, 13Y, 13M and 13C are collectively referred to as the memory tag 26. The nonvolatile memories 27K, 27Y, 27M and 27C (of the memory tags 26K, 26Y, 26M and 26C) are collectively referred to as the nonvolatile memory 27. The second authentication information storage units 28K, 28Y 28M and 28C are collectively referred to as the second authentication information storage unit 28.

In step S101 of FIG. 5A, when a power of the color printer is turned ON or when the top cover 2b is opened and closed (i.e., when there is a possibility that replacement of the toner cartridge 13 has been performed), the control unit 21 causes the RF communication unit 22 to start RF communication with the memory tag 26 mounted on the toner cartridge 13 in order to perform mutual authentication with the memory tag 26.

After the power of the color printer is turned ON or after the top cover 2b is opened and closed, the control unit 21 causes the RF communication unit 22 to attempt the mutual authentication with the memory tag 26 using the authentication logic associated with the authentication data stored in the authentication data storage unit 29 (step S102).

That is, as shown in FIG. 5A, the color printer 1 performs the mutual authentication using the authentication logic 1 associated with the authentication data 1. As shown in FIG. 5B, the color printer 2 performs the mutual authentication using the authentication logic 2 associated with the authentication data 2.

When the mutual authentication with the memory tag 26 is successful (YES in step S103), the RF communication unit 22 becomes accessible to the nonvolatile memory 27 of the memory tag 26 using the RF control unit 23. That is, the RF communication unit 22 becomes able to read data from and write data to the nonvolatile memory 27 (step S104).

When the RF communication unit 22 becomes accessible to the nonvolatile memory 27, the control unit 21 brings the color printer 1 to a standby mode, i.e., a mode in which the control unit 21 waits for the print data sent from the host controller. If the control unit 21 has already received the print data, the control unit 21 causes the color printer 1 to start the printing operation (step S105).

In contrast, when the mutual authentication with the memory tag 26 is not successful (NO in step S103), the RF communication unit 22 notifies the control unit 21 of unsuccessful authentication. The control unit 21 causes the display unit 20 to display a message (i.e., an error message) indicating that the mutual authentication is unsuccessful (step S106).

In this way, the color printers 1, 2, ... N can perform mutual authentication with the common memory tag 26. Therefore, the common toner cartridge 13 can be used for the color printers which are different in time of launch on the market.

That is, the color printer 1 (i.e., the image forming apparatus) includes the first authentication information storage unit 24 storing a plurality of the authentication information 1, 2, ... N, and the authentication data storage unit 29 storing the authentication data for choosing one of the authentication information stored in the first authentication information storage unit 24. Further, the memory tag 26 of the toner cartridge 13 (i.e., the replaceable component) includes the second authentication information storage unit 28 storing a plurality of the authentication information 1, 2, ... N corresponding to those stored in the first authentication information 24. With such a configuration, the common toner cartridge 13 can be used for the color printers which are different from each other, for example, in time of launch on the market.

As described above, according to the first embodiment, the color printers can respectively perform authentication with the memory tag, and therefore the toner cartridge (configured to be compatible with the color printers) can be used in both color printers. Thus, management of the toner cartridge can be simplified. Further, a non-genuine (i.e., non-authenticated) toner cartridge can be detected by the authentication processing.

Second Embodiment

In the above described first embodiment, the authentication data storage unit 29 of each color printer stores a single authentication data. In the second embodiment, the authentication data storage unit 29 stores three authentication data. The other components of the second embodiment are the same as those of the first embodiment.

Figure 7:
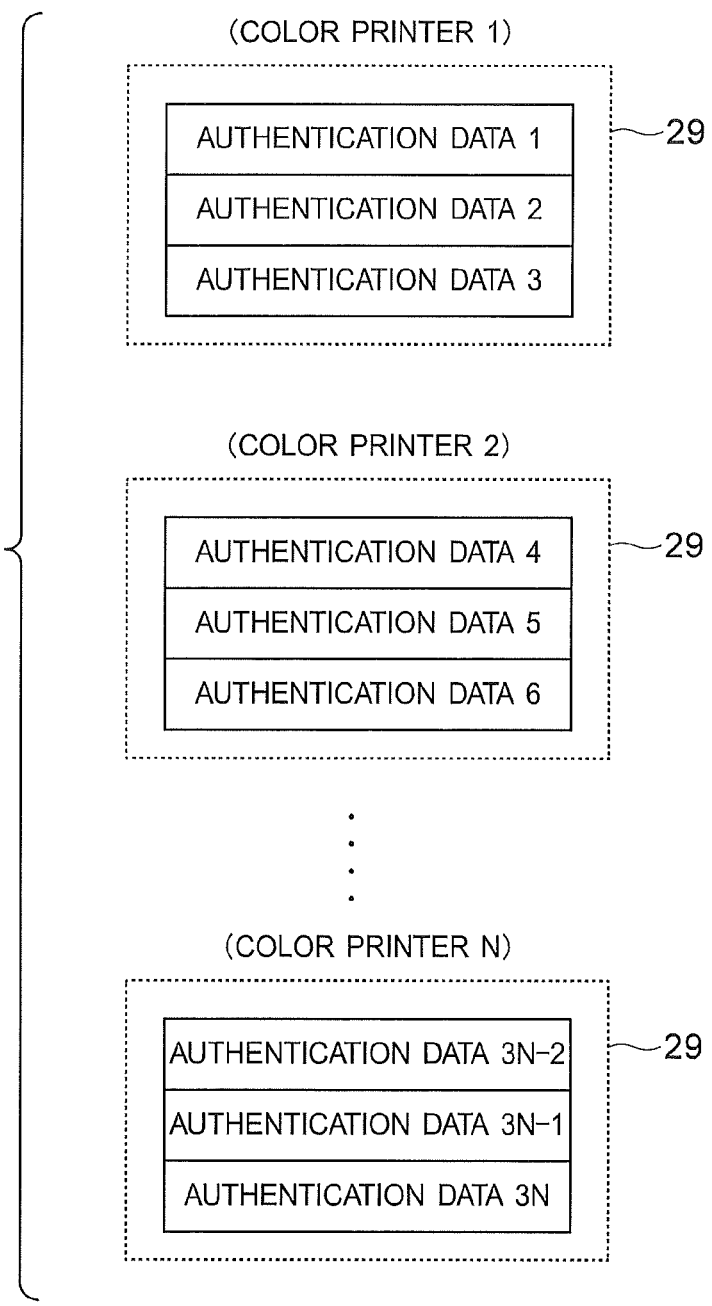
FIG. 7 is a schematic diagram showing memory structures of authentication data storage units of the second embodiment.

FIG. 7 is a schematic diagram showing memory structures of the authentication data storage units 29 of the color printers 1, 2, . . . N. As shown in FIG. 7, the authentication data storage unit 29 of the color printer 1 stores authentication data 1, authentication data 2 and authentication data 3. The authentication data storage unit 29 of the color printer 2 stores authentication data, 4, authentication data 5 and authentication data 6. The authentication data storage unit 29 of the color printer N stores authentication data 3N-2, authentication data 3N-1 and authentication data 3N.

As was described in the first embodiment, the memory tags 26K, 26Y, 26M and 26C includes the nonvolatile memories 27K, 27Y, 27M and 27C and the second authentication information storage units 28K, 28Y, 28M and 28C. Each of the second authentication information storage units 28K, 28Y, 28M and 28C stores a plurality of authentication information. For example, each of the second authentication information storage units 28K, 28Y, 28M and 28C stores authentication information 1, authentication information 2, . . . authentication information 3N as shown in FIG. 9 described later.

The authentication information is authentication logic used in the mutual authentication between the RF communication unit 22 and the memory tags 26K, 26Y, 26M and 26C as described above. One of a plurality of authentication information is chosen based on the authentication data. For example, the color printer 1 having the authentication data 1, the authentication data 2 and the authentication data 3 uses the authentication information 1 (i.e., authentication logic 1), authentication information 2 (i.e., authentication logic 2) and authentication information 3 (i.e., authentication logic 3) in performing the mutual authentication with the memory tags 26K, 26Y, 26M and 26C. The color printer 2 having the authentication data 4, the authentication data 5 and the authentication data 6 uses the authentication information 4 (i.e., authentication logic 4), authentication information 5 (i.e., authentication logic 5) and authentication information 6 (i.e., authentication logic 6) in performing the mutual authentication with the memory tags 26K, 26Y, 26M and 26C.

Figure 8A:
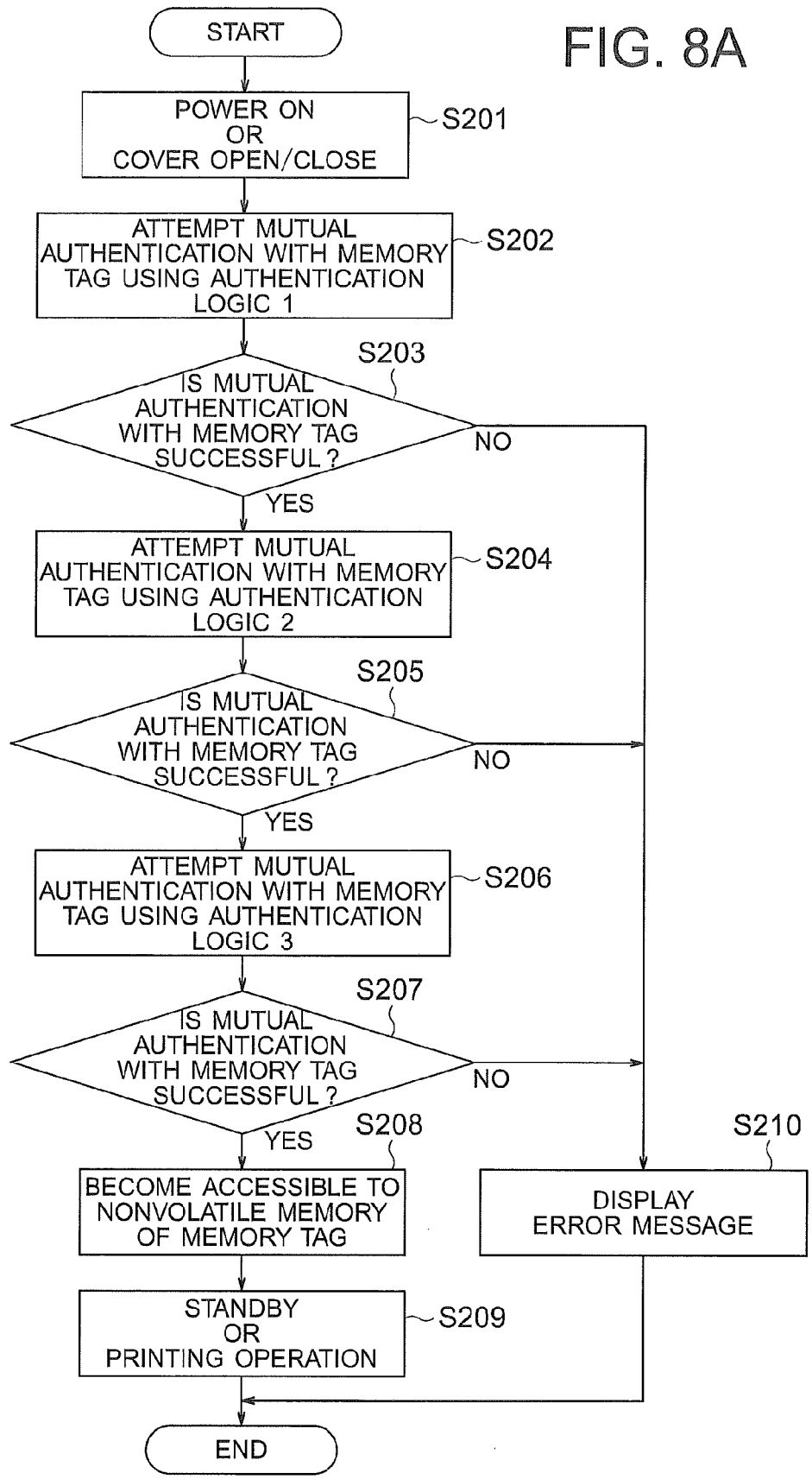
FIG. 8A is a flowchart showing authentication processing with a replaceable component performed by a color printer of the second embodiment.
Figure 8B:
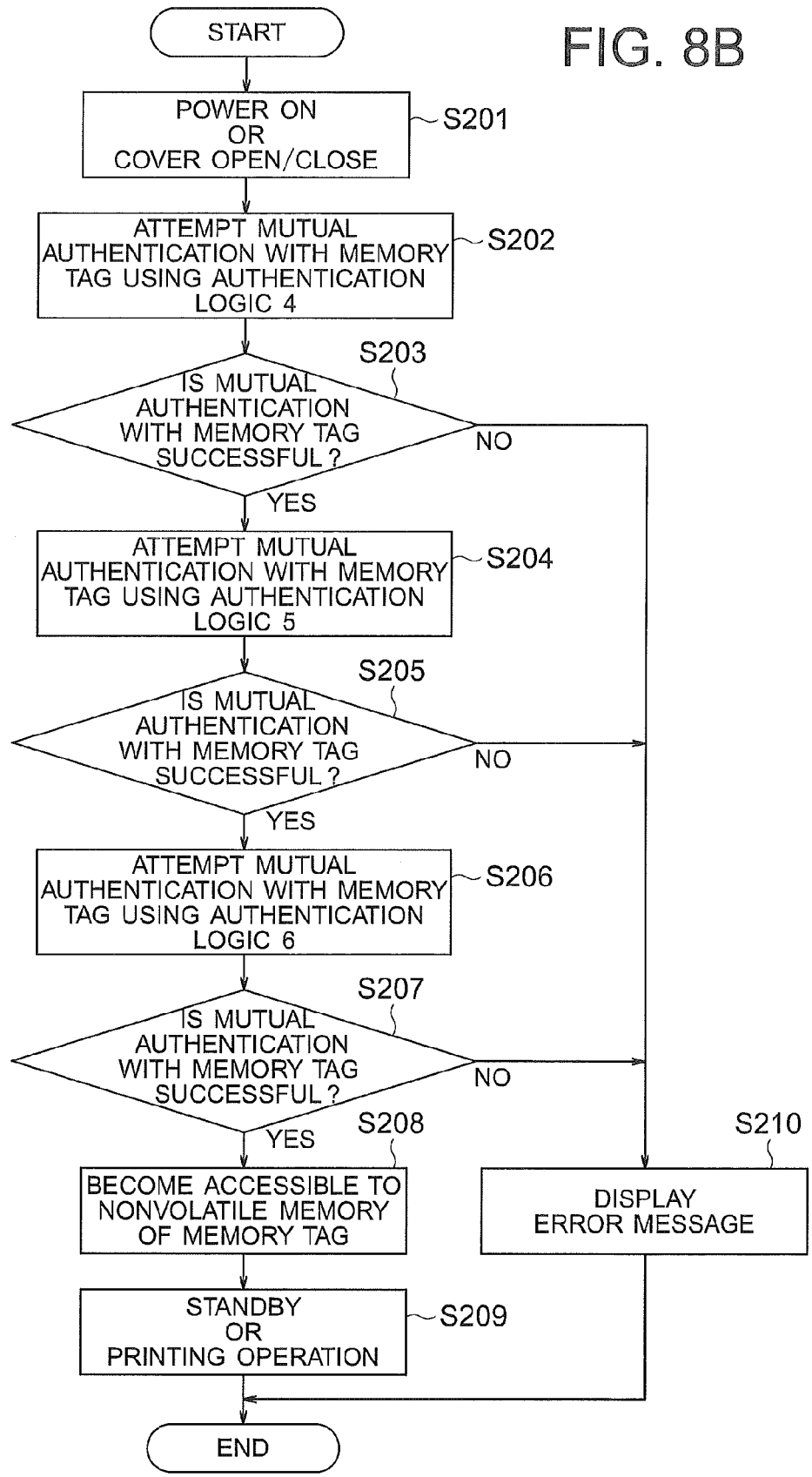
FIG. 8B is a flowchart showing the authentication processing with the replaceable component performed by another color printer of the second embodiment.

Next, description will be made of the authentication processing with the replaceable component performed by the color printer 1. FIGS. 8A and 8B are flowcharts showing the authentication processing with the replaceable component performed by the color printer 1 and the color printer 2. FIG. 9 is a schematic diagram for illustrating mutual authentication of the second embodiment.

In FIG. 9, the color printers 1, 2, 3, . . . N have the configuration of the second embodiment, and are different in time of launched on the market. For example, the color printer 2 was launched on the market 2 years after the color printer 1 was launched on the market. The authentication data storage unit 29 of the color printer 1 stores the authentication data 1, the authentication data 2 and the authentication data 3. The authentication data storage unit 29 of the color printer 2 stores the authentication data 4, the authentication data 5 and the authentication data 6. Similarly, the authentication data storage unit 29 of the color printer N stores the authentication data 3N-2, the authentication data 3N-1 and the authentication data 3N.

FIG. 8A shows the authentication processing performed by the color printer 1. FIG. 8B shows the authentication processing performed by the color printer 2. The authentication processing shown in FIG. 8A and the authentication processing shown in FIG. 8B are the same as each other except the authentication logic used in the mutual authentication.

Hereinafter, the toner cartridges 13K, 13Y, 13M and 13C (i.e., replaceable components) are collectively referred to as the toner cartridge 13. The memory tags 26K, 26Y, 26M and 26C mounted to the toner cartridges 13K, 13Y, 13M and 13C are collectively referred to as the memory tag 26. The nonvolatile memories 27K, 27Y, 27M and 27C (of the memory tags 26K, 26Y, 26M and 26C) are collectively referred to as the nonvolatile memory 27. The second authentication information storage units 28K, 28Y 28M and 28C are collectively referred to as the second authentication information storage unit 28.

In step S201 of FIG. 8A, when a power of the color printer is turned ON or when the top cover 2b is opened and closed (i.e., when there is a possibility that replacement of the toner cartridge 13 has been be performed), the control unit 21 causes the RF communication unit 22 to start RF communication with the memory tag 26 mounted on the toner cartridge 13 in order to perform mutual authentication with the memory tag 26.

After the power of the color printer is turned ON or after the top cover 2b is opened and closed, the control unit 21 causes the RF communication unit 22 to attempt the mutual authentication with the memory tag 26 using the authentication logic associated with the authentication data stored in the authentication data storage unit 29 (step S202).

That is, as shown in FIG. 8A, the color printer 1 performs the mutual authentication using the authentication logic 1 associated with the authentication data 1. As shown in FIG. 8B, the color printer 2 performs the mutual authentication using the authentication logic 4 associated with the authentication data 4.

When the mutual authentication with the memory tag 26 is successful (YES in step S203), the control unit 21 causes the RF communication unit 22 to attempt the mutual authentication with the memory tag 26 using the authentication logic associated with next authentication data stored in the authentication data storage unit 29 (step S204).

That is, as shown in FIG. 8A, the color printer 1 performs the mutual authentication using the authentication logic 2 associated with the authentication data 2. As shown in FIG. 8B, the color printer 2 performs the mutual authentication using the authentication logic 5 associated with the authentication data 5.

When the mutual authentication with the memory tag 26 is successful (YES in step S205), the control unit 21 causes the RF communication unit 22 to attempt the mutual authentication with the memory tag 26 using the authentication logic associated with next authentication data stored in the authentication data storage unit 29 (step S206).

That is, as shown in FIG. 8A, the color printer 1 performs the mutual authentication using the authentication logic 3 associated with the authentication data 3. As shown in FIG. 8B, the color printer 2 performs the mutual authentication using the authentication logic 6 associated with the authentication data 6.

When the mutual authentication with the memory tag 26 is successful (YES in step S207), the RF communication unit 22 becomes accessible to the nonvolatile memory 27 of the memory tag 26 via the RF control unit 23. That is, the RF communication unit 22 becomes able to read data from and write data to the nonvolatile memory 27 (step S208).

When the RF communication unit 22 becomes accessible to the nonvolatile memory 27, the control unit 21 brings the color printer 1 to the standby mode, i.e., a mode in which the control unit 21 waits for the print data to be sent from the host controller. If the control unit 21 has already received the print data, the control unit 21 causes the color printer 1 to start the printing operation (step S209).

In contrast, when the mutual authentication with the memory tag 26 is not successful (NO in step S203, S205 or S207), the RF communication unit 22 notifies the control unit 21 of unsuccessful authentication. The control unit 21 causes the display unit 20 to display a message (i.e., an error message) indicating that the mutual authentication is unsuccessful (step S210).

In this way, the color printers 1, 2, . . . N can perform mutual authentication with the common memory tag 26. Therefore, the common toner cartridge 13 can be used for the color printers which are different from each other, for example, in time of launch on the market.

In the above description, the authentication data storage unit 29 stores three authentication data. However, the number of authentication data stored in the authentication data storage unit 29 is not limited to three, but can be two, four or more.

As described above, according to the second embodiment, the following advantage is obtained in addition to the advantages of the first embodiment. That is, in the second embodiment, each color printer performs authentication processing using a plurality of authentication information, and therefore can detect the non-genuine toner cartridge more precisely. That is, it is ensured that a possibility of use of the non-genuine toner is reduced.

Third Embodiment

In the above described second embodiment, the authentication data storage unit 29 stores a plurality of authentication data. In the third embodiment, one of a plurality of authentication data stored in the authentication data storage unit 29 is chosen at random, and is used in the mutual authentication.

Figure 11:
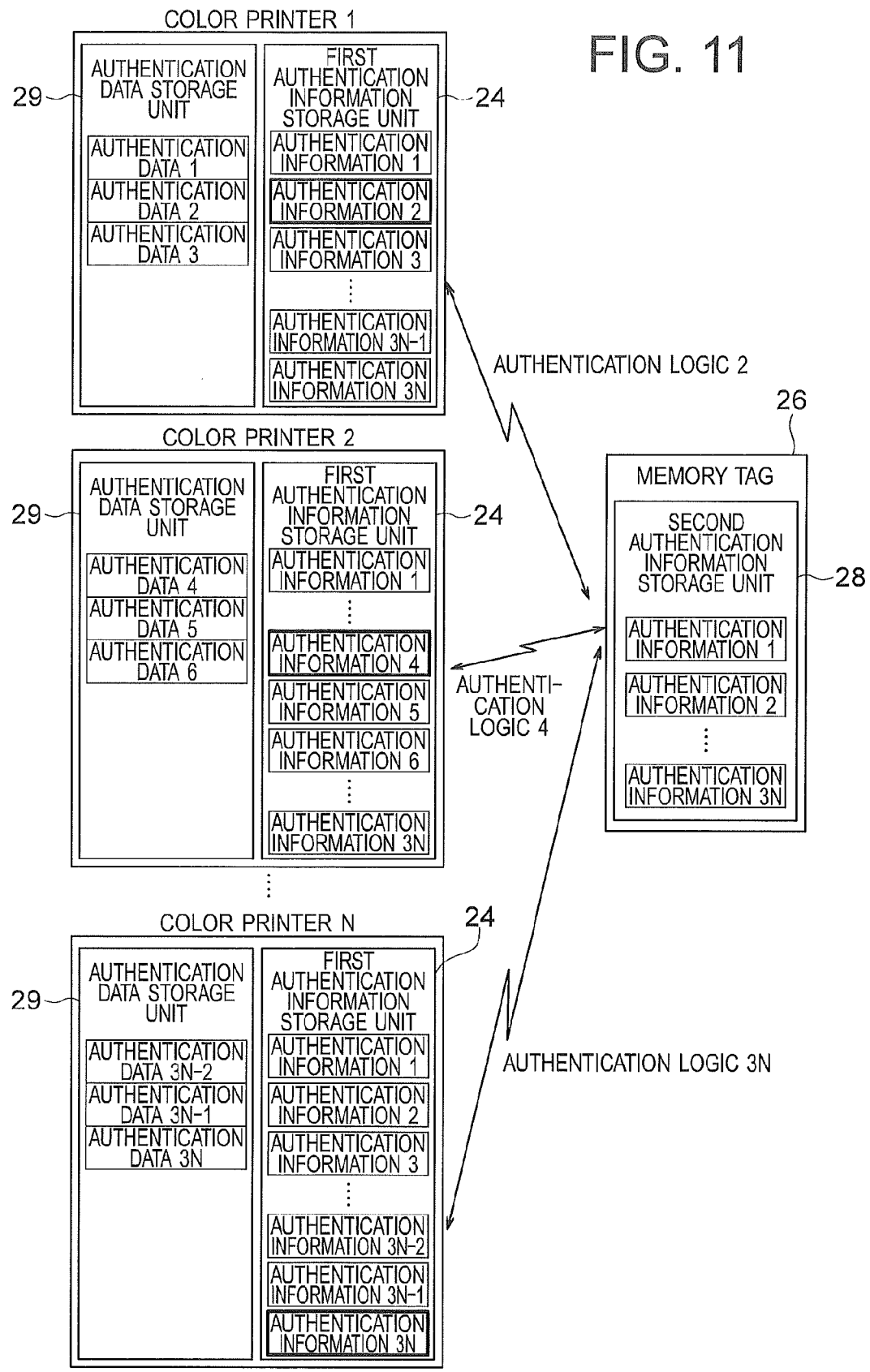
FIG. 11 is a schematic diagram for illustrating mutual authentication of the third embodiment.

Description will be made of the authentication processing with the replaceable component performed by the color printer 1. FIG. 10 is a flowchart showing the authentication processing with the replaceable component performed by the color printer 1. FIG. 11 is a schematic diagram for illustrating mutual authentication of the third embodiment.

In FIG. 11, the color printers 1, 2, 3, . . . N have the configuration of the third embodiment, and are different in time of launch on the market. For example, the color printer 2 was launched on the market 2 years after the color printer 1 was launched on the market. The authentication data storage unit 29 of the color printer 1 stores the authentication data 1, the authentication data 2 and the authentication data 3. The authentication data storage unit 29 of the color printer 2 stores the authentication data 4, the authentication data 5 and the authentication data 6. Similarly, the authentication data storage unit 29 of the color printer N stores the authentication data 3N-2, the authentication data 3N-1 and the authentication data 3N.

Hereinafter, the toner cartridges 13K, 13Y, 13M and 13C (i.e., replaceable components) are collectively referred to as the toner cartridge 13. The memory tags 26K, 26Y, 26M and 26C mounted to the toner cartridges 13K, 13Y, 13M and 13C are collectively referred to as the memory tag 26. The nonvolatile memories 27K, 27Y, 27M and 27C (of the memory tags 26K, 26Y, 26M and 26C) are collectively referred to as the nonvolatile memory 27. The second authentication information storage units 28K, 28Y 28M and 28C are collectively referred to as the second authentication information storage unit 28.

In step S301 of FIG. 10, when a power of the color printer is turned ON or when the top cover 2b is opened and closed (i.e., when there is a possibility that replacement of the toner cartridge 13 has been performed), the control unit 21 causes the RF communication unit 22 to start RF communication with the memory tag 26 mounted on the toner cartridge 13 in order to perform mutual authentication with the memory tag 26.

After the power of the color printer is turned ON or after the top cover 2b is opened and closed, the control unit 21 chooses one of a plurality of authentication data stored in the authentication data storage unit 29 at random (step S302). The control unit 21 chooses the authentication data (from the authentication data storage unit 29) every time the control unit 21 performs authentication with the memory tag 26. Here, it is assumed that the control unit 21 of the color printer 1 chooses the authentication data 2 as shown in FIG. 11.

The control unit 21 causes the RF communication unit 22 to attempt the mutual authentication with the memory tag 26 using the authentication logic associated with the chosen authentication data (step S303). In this example, the color printer 1 performs the mutual authentication using the authentication logic 2 associated with the authentication data 2 chosen in step S302.

When the mutual authentication with the memory tag 26 is successful (YES in step S304), the RF communication unit 22 becomes accessible to the nonvolatile memory 27 of the memory tag 26 via the RF control unit 23. That is, the RF communication unit 22 becomes able to read data from and write data to the nonvolatile memory 27 (step S305).

When the RF communication unit 22 becomes accessible to the nonvolatile memory 27, the control unit 21 brings the color printer 1 to the standby mode, i.e., a mode in which the control unit 21 waits for the print data to be sent from the host controller. If the control unit 21 has already received the print data, the control unit 21 causes the color printer 1 to start the printing operation (step S310).

In contrast, when the mutual authentication with the memory tag 26 is not successful (NO in step S304), the RF communication unit 22 notifies the control unit 21 of unsuccessful authentication. The control unit 21 causes the display unit 20 to display a message (i.e., an error message) indicating that the mutual authentication is unsuccessful (step S307).

As described above, according to the third embodiment, the color printers can respectively perform authentication with the memory tag, and therefore the common toner cartridge can be used in the color printers which are different from each other, for example, in time of launch on the market. Thus, management of the toner cartridge can be simplified.

Moreover, according to the third embodiment, the following advantage is obtained in addition to the advantages of the first embodiment. That is, in the third embodiment, the control unit uses the authentication logic assigned to the authentication data chosen among a plurality of authentication data at random, and therefore can detect the non-genuine toner cartridge more precisely. That is, it is ensured that a possibility of use of the non-genuine toner is reduced.

In the above described third embodiment, the control unit 21 chooses one of a plurality of authentication data at random. However, it is also possible that the control unit 21 chooses two or more among a plurality of authentication data stored in the authentication data storage unit 29.

Figure 12:
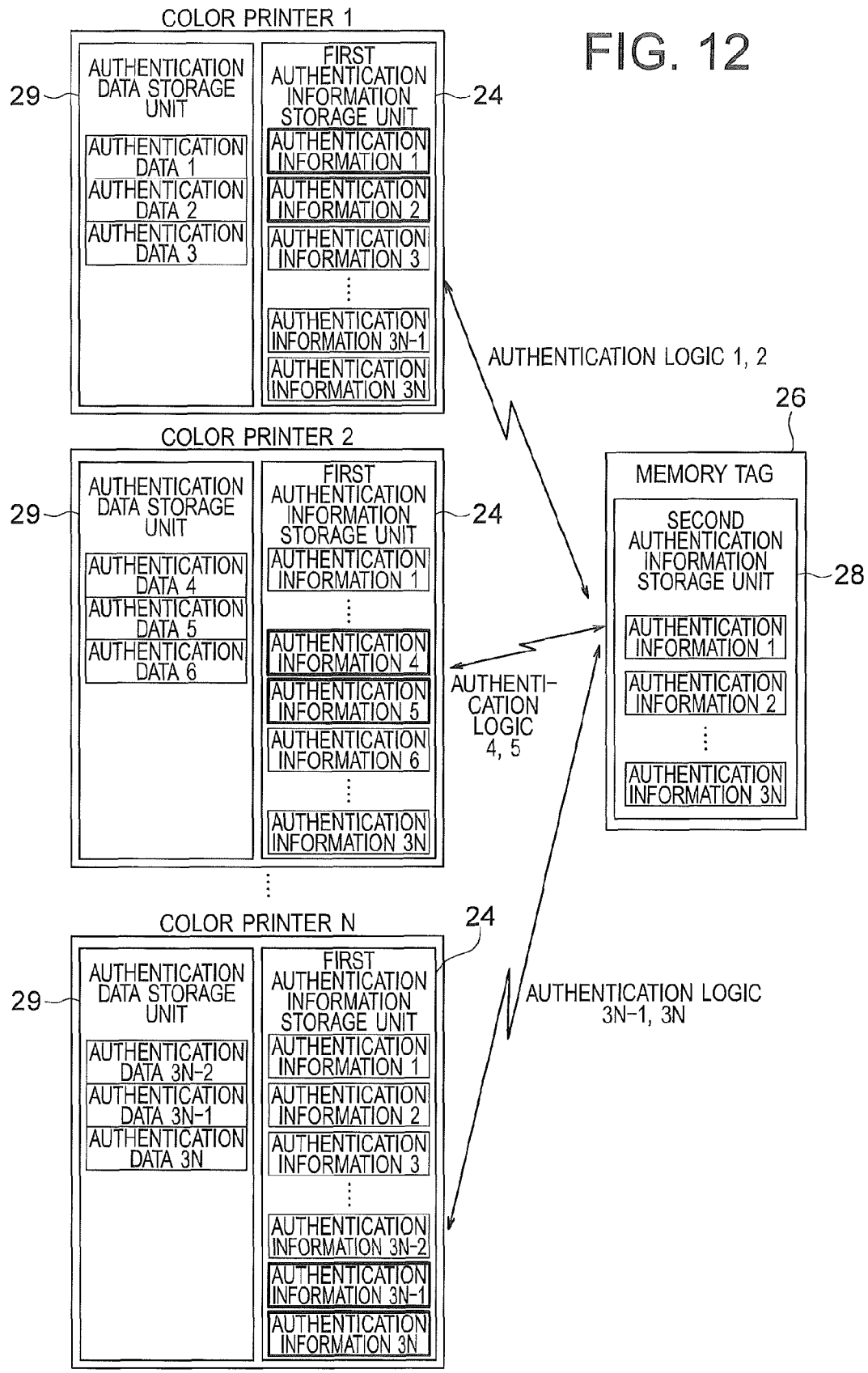
FIG. 12 is a schematic diagram for illustrating another example of mutual authentication of the third embodiment.

For example, FIG. 12 shows an example of the authentication processing of the third embodiment. In the example shown in FIG. 12, the CPI 21 chooses two authentication data among the plurality of authentication data stored in the authentication data storage unit 29 at random. Then, the control unit 21 causes the RF communication unit 22 to perform the mutual authentication with the memory tag 26 using two authentication information (i.e., two information logic) associated with the authentication data. In this regard, the number of authentication data stored in the authentication data 29 and the number of authentication data chosen therefrom can be arbitrarily determined.

In the above described embodiments, the color printers 1, 2, . . . N are different in time of launch on the market. However, it is also possible that the color printers 1, 2, . . . N are different in other respects.

In the above described embodiments, the color image forming apparatus (i.e., the color printer) of a tandem type as shown in FIG. 1 has been described. However, the present invention is not limited to such a configuration. The present invention is also applicable to a monochrome image forming apparatus using a single toner cartridge. The present invention is also applicable to a copier, a facsimile, a MFP (Multi-Function peripheral).

While the preferred embodiments of the present invention have been illustrated in detail, it should be apparent that modifications and improvements may be made to the invention without departing from the spirit and scope of the invention as described in the following claims.

What is claimed is:

1. An image forming apparatus comprising:
a main body; and
a replaceable component mounted to the main body, the replaceable component being configured to be compatible with a plurality of image forming apparatuses,
wherein the main body comprises:
a first authentication information storage unit that stores a plurality of first authentication information for authentication with the replaceable component;
an authentication data storage unit that stores authentication data for choosing at least one of the plurality of first authentication information;
a first communication unit for communication with the replaceable component; and
a control unit that controls the first communication unit,
wherein the replaceable component comprises:
a second authentication information storage unit that stores a plurality of second authentication information corresponding to the first authentication information; and
a second communication unit for communication with the first communication unit;
wherein the authentication data is set to be different among the plurality of image forming apparatuses;
wherein the control unit attempts authentication with the replaceable component using the first authentication information chosen based on the authentication data by checking whether the second authentication information corresponding to the chosen first authentication information is stored in the second authentication information storage unit; and
wherein when the second authentication information corresponding to the chosen first authentication information is stored in the second authentication information storage unit, the control unit establishes connection between the first communication unit and the second communication unit.

2. The image forming apparatus according to claim 1, wherein the plurality apparatuses comprises a first image forming apparatus and a second image forming apparatus;
wherein the authentication data storage unit of the first image forming apparatus stores authentication data 1, and
wherein the authentication data storage unit of the second image forming apparatus stores authentication data 2.

3. The image forming apparatus according to claim 2, wherein the first image forming apparatus and the second image forming apparatus are different from each other in time of launch on the market.

4. The image forming apparatus according to claim 1, wherein the authentication data storage unit stores a predetermined number of authentication data, and
wherein the control unit attempts authentication with the replaceable component using a predetermined number of first authentication information assigned to the predetermined number of authentication data.

5. The image forming apparatus according to claim 1, wherein the authentication data storage unit stores a predetermined number of authentication data, and
wherein the control unit chooses one of the predetermined number of authentication data stored in the authentication data storage unit, and attempts authentication with the replaceable component using the first authentication information assigned to the chosen authentication data.

6. The image forming apparatus according to claim 5, wherein the control unit chooses the one of the predetermined number of authentication data at random.

7. The image forming apparatus according to claim 1, wherein the authentication data storage unit stores a predetermined number of authentication data, and
wherein the control unit chooses at least two of the predetermined number of authentication data stored in the authentication data storage unit, and attempts authentication with the replaceable component using the first authentication information assigned to the chosen authentication data.

8. The image forming apparatus according to claim 7, wherein the control unit chooses the at least two of the predetermined number of authentication data at random.

9. The image forming apparatus according to claim 1, wherein the replaceable component is a developer cartridge storing a developer, and
wherein the image forming apparatus further comprises an image forming section that forms an image using the developer supplied by the developer cartridge.

10. The image forming apparatus according to claim 9, wherein the control unit allows the image forming section to form the image only when connection between the first communication unit and the second communication unit is established.

11. The image forming apparatus according to claim 1, wherein the first authentication information storage unit and the second authentication information storage unit store the same information.

12. The image forming apparatus according to claim 1, further comprising a display unit, and
wherein the control unit causes the display unit to display an error message when the control unit cannot successfully perform the authentication with the replaceable component.

13. The image forming apparatus according to claim 1, wherein the second communication unit is a memory tag, and the authentication information storage unit is provided on the memory tag.

14. The image forming apparatus according to claim 13, wherein the first communication unit further comprises an antenna and an RF communication unit for communication with the memory tag.

* * * * *